(12) United States Patent
Mogi

(10) Patent No.: US 8,928,719 B2
(45) Date of Patent: Jan. 6, 2015

(54) OPTICAL SCANNING APPARATUS WITH OPTICAL BOX SEALED BY A DEFORMABLE SEALING MEMBER

(71) Applicant: Canon Kabushiki Kaisha, Tokyo (JP)

(72) Inventor: Shin Mogi, Kawashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/947,998

(22) Filed: Jul. 22, 2013

(65) Prior Publication Data
US 2013/0308171 A1 Nov. 21, 2013

Related U.S. Application Data

(62) Division of application No. 12/395,557, filed on Feb. 27, 2009, now abandoned.

(30) Foreign Application Priority Data

Mar. 6, 2008 (JP) ................. 2008-057079

(51) Int. Cl.
B41J 2/435 (2006.01)
G03G 15/04 (2006.01)
B41J 2/47 (2006.01)
G02B 27/00 (2006.01)
G02B 23/16 (2006.01)

(52) U.S. Cl.
CPC ...... *G02B 27/0006* (2013.01); *G03G 15/04036* (2013.01); *G03G 2215/0132* (2013.01); *B41J 2/473* (2013.01)
USPC .......................................... 347/245; 359/513

(58) Field of Classification Search
USPC .......................................... 347/245; 359/513
See application file for complete search history.

(56) References Cited

U.S. PATENT DOCUMENTS

| 5,377,038 A | 12/1994 | Uzuki et al. ................. 359/205 |
| 5,479,201 A | 12/1995 | Sugiura et al. ............... 347/257 |
| 5,490,158 A | 2/1996 | Mogi ............................. 372/36 |
| 5,581,391 A | 12/1996 | Uzuki et al. ................. 359/205 |

(Continued)

FOREIGN PATENT DOCUMENTS

| JP | 6-273682 | 9/1994 |
| JP | 10-246864 | 9/1998 |

(Continued)

OTHER PUBLICATIONS

Chinese Office Action dated Aug. 4, 2010, from corresponding Chinese Application No. 200910007974.1, and English language translation thereof.

(Continued)

*Primary Examiner* — Laura Martin
*Assistant Examiner* — Jeremy Bishop
(74) *Attorney, Agent, or Firm* — Fitzpatrick, Cella, Harper & Scinto

(57) ABSTRACT

A scanning optical apparatus includes an optical box accommodating a deflection device for scanningly deflecting a laser beam emitted by a light source and an optical part for directing the laser beam toward a member-to-be-scanned; a cap mounted to the optical box; a sealing member extending from the cap, wherein the sealing member is made of a material exhibiting easier deformation than the cap, and is contacted to a wall of the optical box in a deformed state.

8 Claims, 11 Drawing Sheets

(56) References Cited

U.S. PATENT DOCUMENTS

| | | | |
|---|---|---|---|
| 5,845,803 A * | 12/1998 | Saito et al. | 220/378 |
| 7,044,475 B2 | 5/2006 | Imai et al. | 277/650 |
| 7,248,280 B2 * | 7/2007 | Cannon et al. | 347/263 |
| 7,311,311 B2 * | 12/2007 | Hosokawa | 277/641 |
| 7,413,099 B2 * | 8/2008 | Takahashi et al. | 220/806 |
| 2006/0081635 A1 | 4/2006 | Matsutori et al. | 220/378 |
| 2007/0165204 A1 * | 7/2007 | Kibayashi et al. | 355/78 |
| 2013/0135419 A1 * | 5/2013 | Otoguro | 347/224 |

FOREIGN PATENT DOCUMENTS

| | | | | |
|---|---|---|---|---|
| JP | 2000-056249 | 2/2000 | | |
| JP | 2001-100134 | 4/2001 | | |
| JP | 3352332 | 12/2002 | | |
| JP | 2003-20411 | 1/2003 | | |
| JP | 2003-277622 | 10/2003 | | |
| JP | 2004-151495 | 5/2004 | | |
| JP | 2004-262118 | 9/2004 | | |
| JP | 2004262118 A * | 9/2004 | | B41J 29/13 |
| JP | 2008-268348 | 11/2008 | | |

OTHER PUBLICATIONS

Notification of Second Office Action dated Feb. 6, 2012, in counterpart Chinese Application No. 200910007974.1 and English language translation thereof.

* cited by examiner

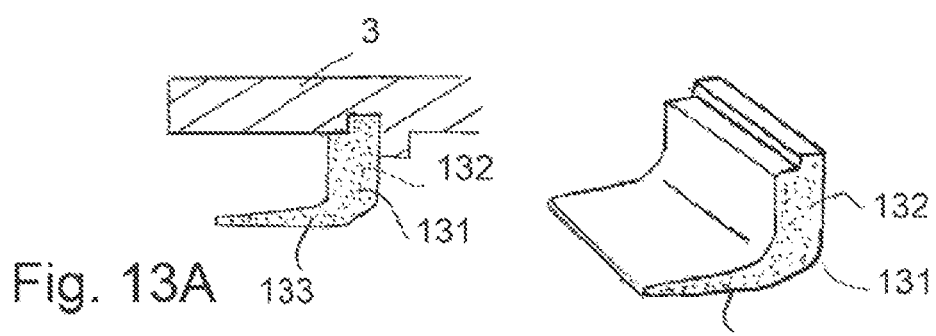
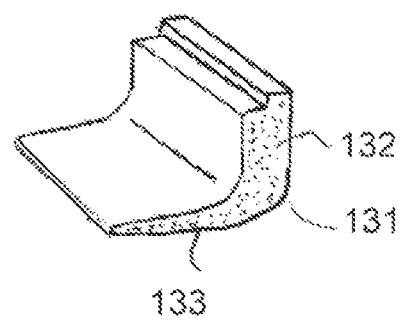
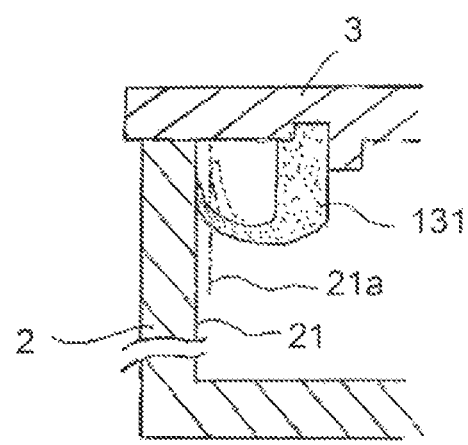
Fig. 13A
Fig. 13B
Fig. 13C

OPTICAL SCANNING APPARATUS WITH OPTICAL BOX SEALED BY A DEFORMABLE SEALING MEMBER

CROSS REFERENCE TO RELATED APPLICATION

This application is a divisional of U.S. patent application Ser. No. 12/395,557, filed Feb. 27, 2009 (currently pending), which is incorporated by reference herein in its entirety, as if fully set forth herein, and claims the benefit of priority under 35 U.S.C. §119, based on Japanese Priority Application No. 2008-057079, filed Mar. 6, 2008, which is incorporated by reference herein in its entirety, as if fully set forth herein.

BACKGROUND OF THE INVENTION

Field of the Invention and Related Art

The present invention relates to an optical scanning apparatus for scanning the surface of an image bearing member with a beam of laser light. More specifically, it relates to an optical scanning apparatus mountable in an image forming apparatus, for example, an electrophotographic copying machine, a printer, a facsimile machine, and a multifunction image forming apparatus made up of a combination of the preceding apparatuses.

First, referring to FIG. 12, an example of a conventional optical scanning apparatus mountable in an image forming apparatus, such as an electrophotographic copying machine, a printer, a facsimile machine, and a multifunction image forming apparatus made up of a combination of the preceding image forming apparatuses, will be described.

The optical scanning apparatus shown in FIG. 12 generally has a light source unit 30a and a cylindrical lens 30b. The light source unit 30a is made up of a semiconductor laser, a collimator lens, etc., and emits a beam of laser light, which is a parallel beam of light. The cylindrical lens 30b focuses, in terms of the secondary scanning direction, the beam of laser light emitted by the light source unit 30a semiconductor laser. The optical scanning apparatus also has a rotational polygonal mirror 33 (polygon mirror), a lens 34, and a lens 41. The polygon mirror 33 deflects the beam of laser light emitted by the light source unit 30a, in such a manner that the beam of laser light moves in a manner to scan the peripheral surface of an electrophotographic photosensitive member 10 (which hereafter will be referred to as "photosensitive drum 10"). The lenses 34 and 41 focus the beam of laser light on the peripheral surface of the photosensitive drum 10 while the beam of laser light is deflected in the above described manner. The polygon mirror 33, lenses 34 and 41, mirror 51, etc., which are optical components, are disposed in an optical box 2. Further, after the polygon mirror 33, lenses 34 and 41, mirror 51, etc., are disposed in the optical box 2, a lid (unshown) is attached to the optical box 2 to hermetically seal the optical box 2.

The beam of laser light emitted by the semiconductor laser of the optical unit 30a is focused on the reflective surfaces of the polygon mirror 33 by the cylindrical lens 30b. As the beam of laser light is focused on the reflective surface of the polygon mirror 33, it is deflected in a manner to scan the peripheral surface of the photosensitive drum 10 through the lenses 34 and 41. As the beam of laser light is transmitted through the lenses 34 and 41, it is focused on the peripheral surface of the photosensitive drum 10 while being moved in the manner to scan the peripheral surface of the photosensitive drum 10 in the direction parallel to the axial line of the photosensitive drum 10 (which hereafter may be referred to simply as primary scan direction).

Since the beam of laser light is moved, while remaining focused on the peripheral surface of the photosensitive drum 10, in the primary direction while the photosensitive drum 10 is rotated in the direction perpendicular to the axial line of the photosensitive drum 10 (which hereafter may be referred to simply as secondary scan direction), an electrostatic latent image is formed on the peripheral surface of the photosensitive drum 10.

In order to obtain a high quality image with the use of an image forming apparatus equipped with an optical scanning apparatus, such as the one described above, it is important that the optical components, more specifically, the polygon mirror 33, lenses 34 and 41, mirror 51, etc., are not soiled. Thus, in order to prevent the optical components from being soiled, the optical scanning apparatus is structured so that it is difficult for the dusts to enter the apparatus. For example, an ordinary optical scanning apparatus is provided with such a sealing member that is placed between the optical box 2 and the lid for the optical box 2 to prevent dusts from entering the optical box 2 through the gap(s) between the optical box 2 and lid.

However, with the scanning optical apparatus of Japanese patent 3352332, the sealing member is compressed between the optical box and the cap, and therefore, the rigidity of the sealing member is increased by the compression. Then, the optical box or the cap is deformed by the high rigidity portion, or the elasticity of the sealing member is not high enough to accommodate the deformation of the optical box or the cap, with the result of liability of deforming the optical box or the cap. Because of this, the scanning laser beam may deviates on the photosensitive drum.

Japanese Laid-open Patent Application Hei 06-273682 proposes a solution to this problem, wherein a close-contact rib is extended from the cap, and the rib is closely contacted to the side wall of the optical box with elastic deformation.

In this apparatus, the close-contact rib is integrally molded with the cap. The material of the cap exhibits a property of uneasy deformation in order to enhance the rigidity of the optical box. Since the close-contact rib is integral with the cap, the close-contact rib exhibits the property of uneasy deformation. Although the close-contact rib deforms elastically when it is mounted to the optical box, the close-contact rib applies a force to the side wall and/or the cap because of its property. This would result in deformation of the optical box.

SUMMARY OF THE INVENTION

The present invention was made in consideration of the above described problem. Thus, the primary object of the present invention is to provide an optical scanning apparatus, the sealing member of which can keep the optical box of the apparatus satisfactory reliably sealed without causing the optical box of the apparatus to deform.

According to an aspect of the present invention, there is provided a scanning optical apparatus comprising an optical box accommodating a deflection device for scanningly deflecting a laser beam emitted by a light source and an optical part for directing the laser beam toward a member-to-be-scanned; a cap mounted to said optical box; a sealing member extending from said cap; wherein said sealing member is made of a material exhibiting easier deformation than said cap, and is contacted to a wall of said optical box in a deformed state.

The further features of the present invention will become apparatus from the following description of exemplary embodiments (with reference to the attached drawings).

BRIEF DESCRIPTION OF THE DRAWINGS

FIGS. 13A, 13B and 13C illustrate a bent type sealing member according to a third embodiment of the present invention.

DESCRIPTION OF THE PREFERRED EMBODIMENTS

Hereinafter, the optical scanning apparatuses in accordance with the present invention will be described in more detail with reference to the appended drawings.

Embodiment 1

Figure 1:
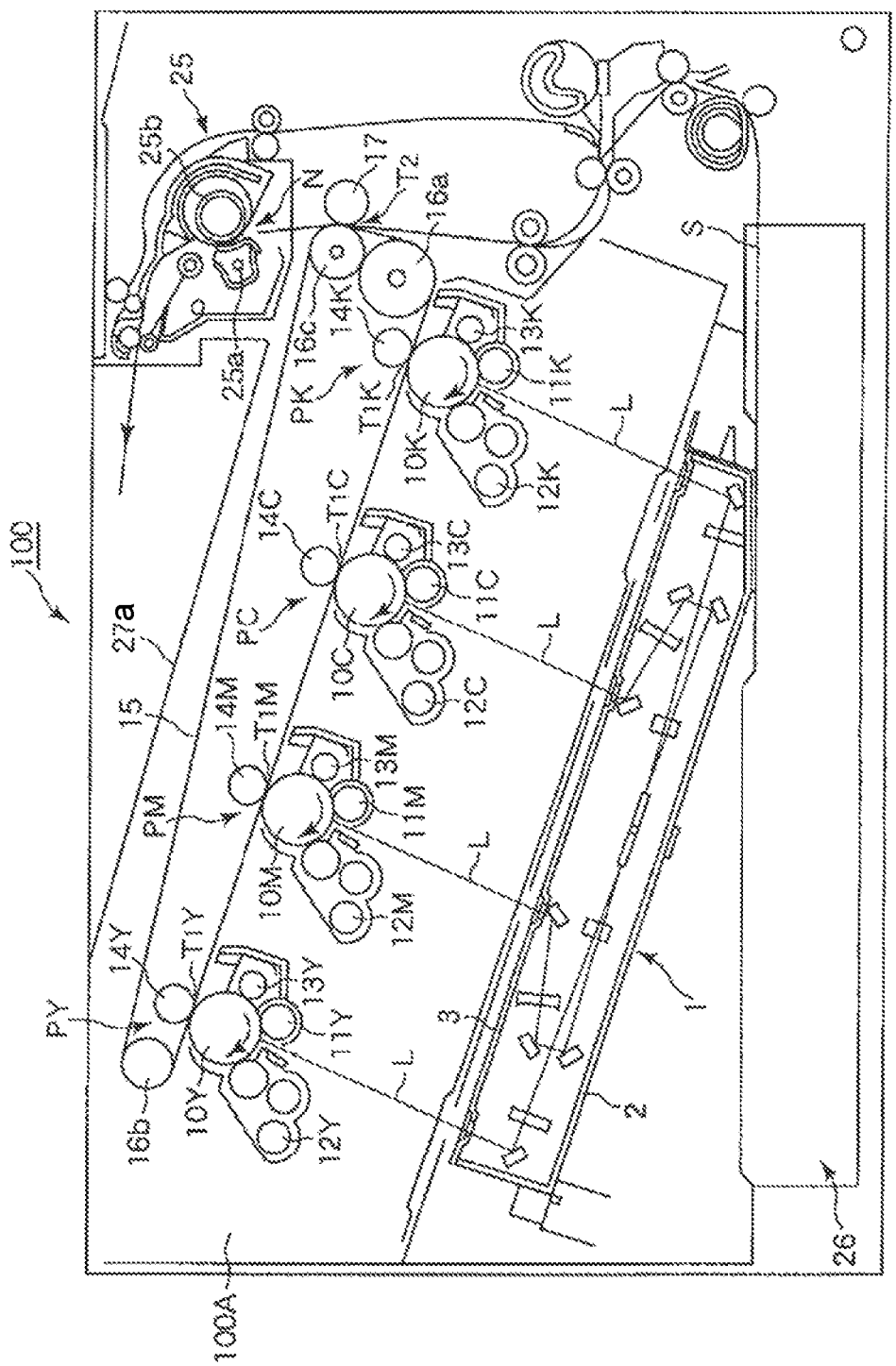
FIG. 1 is a sectional view of an electrophotographic full-color printer as an example of an image forming apparatus in which an optical scanning apparatus in accordance with the present invention is mountable, and shows the general structure of the image forming apparatus.
Figure 2:
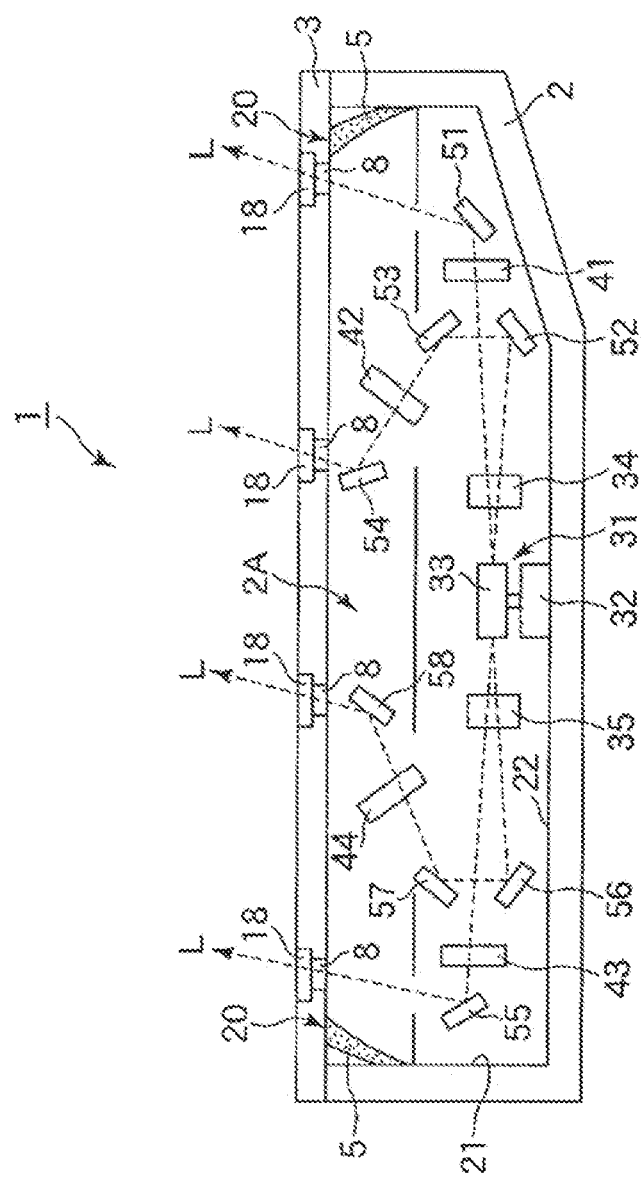
FIG. 2 is a sectional view of the optical scanning apparatus in the first preferred embodiment of the present invention, and shows the general structure of the apparatus.

FIG. 1 is a sectional view of an electrophotographic full-color printer, as an example of an image forming apparatus, in which the optical scanning apparatus in accordance with the present invention is mountable. It shows the general structure of the image forming apparatus. FIG. 2 is a sectional view of the optical scanning apparatus in this preferred embodiment of the present invention. It shows the general structure of the apparatus.

(General Structure of Image Forming Apparatus)

First, referring to FIG. 1, the electrophotographic full-color printer, as an example of an image forming apparatus, in which the optical scanning apparatus in accordance with the present invention is mountable, will be described. The image forming apparatus 100 in this embodiment is of a so-called tandem type. It has four image forming portions (PY, PM, PC, and PK), which are disposed in tandem in a straight line.

The image forming apparatus has: an image forming portion PY, which is for forming yellow images; an image forming portion PM, which is for forming magenta images; an image forming portion PC, which is for forming cyan images; and an image forming portion PK, which is for forming black images. The four image forming portions PY, PM, PC, and PK are disposed in a straight line with the presence of preset intervals.

Each of the image forming portions PY, PM, PC, and PK has: the photosensitive drum 10 (10Y, 10M, 10C, or 10K) as an image bearing member. In the adjacencies of the peripheral surface of each of the photosensitive drums 10Y, 10M, 10C, and 10K, a primary charging device 11 (11Y, 11M, 11C, and 11K, respectively) for uniformly charging the peripheral surface of the photosensitive drum 10 is disposed. Also disposed in the adjacencies of the peripheral surface of each of the photosensitive drums 10Y, 10M, 10C, and 10PK is a developing apparatus 12 (12Y, 12M, 12C, and 12BK, respectively) for developing the electrostatic latent image formed on the photosensitive drum 10 by the optical scanning apparatus (which will be described later), into a toner image (image formed of toner). The developing apparatuses 12Y, 12M, 12C, and 12BK contain yellow, magenta, cyan, and black toners, respectively.

Further, an intermediary transfer belt 15, and transfer rollers 14 (14Y, 14M, 14C, and 14K) for transferring the toner image on the photosensitive drum 10, from the photosensitive drum 10 to the intermediary transfer belt 15, are disposed in the adjacencies of the peripheral surface of the photosensitive drum 10. The intermediary transfer belt 15 is disposed so that it is on the top side of each of the photosensitive drums 10Y, 10M, 10C, and 10K). It is supported by a secondary transfer roller 16*a* and a pair of tension rollers 16*b* and 16*c*, remaining stretched by the rollers. The aforementioned four primary transfer rollers 14Y, 14M, 14C, and 14K are disposed on the inward side of the loop which the intermediary transfer belt 15 forms. The four transfer rollers 14Y, 14M, 14C, and 14K are enabled to be pressed against the peripheral surfaces of the photosensitive drums 10Y, 10M, 10C, and 10K, respectively, with the presence of the intermediary transfer belt 15, as an intermediary transferring member, between the transfer rollers 14Y, 14M, 14C, and 14K and photosensitive drums 10Y, 10M, 10C, and 10K, respectively.

Further, there are a drum cleaning apparatuses 13 (13Y, 13M, 13C, and 13K) for removing the residual toner on the photosensitive drums 10 (10Y, 10M, 10C, and 10K, respectively) in the adjacencies of the peripheral surfaces of the photosensitive drums 10Y, 10M, 10C and 10K, respectively.

Further, there is an optical scanning apparatus 1, as an exposing apparatus, which is disposed below the primary charging devices 11Y, 11M, 11C, and 11K and developing apparatuses 12Y, 12M, 12C, and 12K.

The photosensitive drum 10, primary charging device 11, developing apparatus 12, cleaning apparatus 13, etc., of each of the image forming portions P may be integrally disposed in a cartridge which is removably mountable in the main assembly 10A of the image forming apparatus 100. Each of the photosensitive drums 10Y, 10M, 10C, and 10k is an organic photosensitive member which is negatively chargeable. It has an aluminum drum as the substrate, and a photoconductive layer placed on the peripheral surface of the aluminum substrate. It is rotated by a driving apparatus (unshown) in the direction indicated by arrow marks (clockwise direction in FIG. 1) at a preset process speed.

(Optical Scanning Apparatus)

Next, the optical scanning apparatus in this embodiment will be described with reference to FIG. 2, which is an enlarged sectional view of the optical scanning apparatus 1 used by the color image forming apparatus 100 of the tandem type, which was described with reference to FIG. 1. FIG. 2 shows the general structure of the optical scanning apparatus 1.

Referring to FIG. 2, the optical scanning apparatus 1 has an optical box 2, which is roughly in the form of an ordinary rectangular box. The optical box 2 is provided with a lid 3, which is for covering the opening 2A of the optical box 2 to airtightly seal the optical box. The lid 3 is provided with windows 8 through which the photosensitive drums 10 are exposed, one for one. Each window 8 is in the form of a long and narrow rectangular slit. The window 8 is covered with a piece of glass 18 for preventing dusts from entering the optical box 2, while allowing the beam of laser light to be projected out of the optical box 2.

Next, the optical scanning apparatus 1 in this embodiment will be described regarding its internal structure.

Referring again to FIG. 2, the optical scanning apparatus 1 has a deflecting device 31, as a means for deflecting light, which is made up of a polygon mirror 33 and a brushless motor 32.

The beam of laser light emitted from a light source (unshown) is projected onto the deflecting device 31 through a collimator lens (unshown) and a compound cylindrical lens (unshown). The deflecting device 31 deflects the beam of laser light, which corresponds to black "color" K and cyan color C, by its right side, and the beam of laser light, which corresponds to magenta color M and yellow color M, by its left side.

Also referring to FIG. 2, the optical system for the black color K and the optical system for the cyan color C are in the right portion of the optical scanning apparatus 1 relative to the deflecting device 31, whereas the optical system for the magenta color M and the optical system for the yellow color Y are in the left portion of the optical scanning apparatus 1 relative to the defective device 31. The four optical systems are independent from each other, and are positioned in the light path which is behind the deflective device 31. Each optical system is made up of focusing lenses, deflective mirrors, etc., and is disposed in a manner to stand in the light path of the deflecting device 31. As the beam of laser light is deflected by the deflecting device 31 in the manner of scanning the peripheral surface of each of the photosensitive drums 10 (10Y, 10M, 10C, or 10K), it is focused on the peripheral surface of each photosensitive drums 10 by the corresponding optical system, while being moved in the manner of scanning the peripheral surface of the photosensitive drum 10.

More specifically, each of the abovementioned optical systems has such optical components as a pair of first focusing lenses 34 and 35, four second focusing lenses 41, 42, 43, and 44, eight deflective mirrors 51, 52, 53, 54, 55, 56, 57, and 58. The first focusing lenses 34 and 35 and the second focusing lenses 41, 42, 43, and 44 are for correcting the beam of laser light in the f-θ factor. Further, the second focusing lenses 41, 42, 43, and 44 have also the function of keeping the beam of laser light focused on the peripheral surface of the photosensitive drum 10 while the beam of laser light is moved in the secondary scanning direction.

Next, the image forming process of the image forming apparatus in this embodiment will be described. First, an image formation start signal is outputted. As the signal is outputted, the photosensitive drums 10Y, 10M, 10C, and 10K of the image forming portions PY, PM, PC, and PK begin to be rotationally driven at the predetermined process speed, while being uniformly charged by the primary charging devices 11Y, 11M, 11C, and 11K, respectively, to the negative polarity. The optical scanning apparatus 1, that is, an exposing apparatus, projects the beam of laser light while modulating the beam of laser light with the external image formation signals, which correspond to each of the monochromatic color images (or image) into which an intended image has been separated. As a result, an electrostatic latent image is effected on the peripheral surface of each of the photosensitive drums 10Y, 10M, 10C, and 10K.

Then, a development bias, which is the same in polarity as the polarity to which the photosensitive drum 10Y was charged, is applied to the electrostatic latent image on the photosensitive drum 10Y. As a result, the electrostatic latent image on the photosensitive drum 10Y develops into a yellow toner image (toner image formed of yellow toner). This toner image is transferred (primary transfer) onto the intermediary transfer belt 15 (which is being driven) by the transfer roller 14Y (to which primary transfer bias (positive), which is opposite in polarity to toner, is being applied), in a primary transfer portion T1Y, which is between the peripheral surface of the photosensitive drum 10Y and the peripheral surface of the transfer roller 14Y. The processes for forming the monochromatic images of the other colors are the same as the above described process for forming the yellow monochromatic image. The monochromatic color toner images on the photosensitive drums 10, one for one, are transferred in layers onto the intermediary transfer belt 15.

Then, the toner images on the intermediary transfer belt 15 are transferred onto a recording medium (sheet of recording medium, for example) in a second transfer portion T2 while the recording medium is conveyed through the secondary transfer portion T2, in synchronism with the toner images. Then, the toner images on the recording medium are thermally fixed to the recording medium by a fixing device 25, which is on the downstream side of the secondary transfer portion T2 in terms of the recording medium conveyance direction. Then, the recording medium is discharged into a delivery portion 27a (delivery tray).

Meanwhile, the toner particles remaining on the peripheral surface of each photosensitive drum 10, that is, the toner particles which were not transferred onto the intermediary transfer belt 15 in the primary transfer portion T1, are removed from the photosensitive drums 10Y, 10M, 10C, and 10K, by drum cleaning apparatuses 13Y, 13M, 13C, and 13K, respectively. As for the toner particles, or the like, remaining on the intermediary transfer belt 15 are removed and recovered, by a belt cleaning apparatus (unshown).

The optical scanning apparatus 1 exposes each of the photosensitive drums 10Y, 10M, 10C, and 10K by deflecting the beam of laser light in such a manner that the beam of laser light scans the peripheral surface of each photosensitive drum 10. As a result, an electrostatic latent image is formed on the peripheral surface of each of the photosensitive drums 10Y, 10M, 10C, and 10K, which have just been charged by the primary charging devices 11Y, 11M, 11C, and 11K, respectively. The electrostatic latent images formed on the photosensitive drums 10Y, 10M, 10C, and 10K, one for one, reflect the information of the intended image.

At this time, the characteristic features of the optical scanning apparatus 1 in this embodiment will be described. The revolution of the polygon mirror 33 of the optical scanning apparatus 1 is 20,000-30,000 rpm. Since the polygon mirror 33 is rotated at such a high speed, the sealed optical box becomes nonuniform in internal pressure. As a portion (portions) of the internal space of the optical box, which is adjacent to the gap(s) in the optical box 2 and lid 3, becomes lower in pressure than the ambience of the optical box 2, the ambient air flows into the optical box. As the ambient air flows into the optical box 2, the dusts or the like floating in the ambient air enters the optical box along with the ambient air, and soil the optical components, that is, the abovementioned polygon mirror, lenses, mirrors, etc.

In order to prevent this problem, the optical box is provided with an elastic sealing member, which is placed between the optical box and lid to prevent the intrusion of the dusts or the like into the optical box. As the material for this sealing member, an elastic substance, such as thermoplastic elastomer, is used.

Here, "thermoplastic elastomer" includes all the polymers which are as elastic as vulcanized rubber at a temperature level at which they are used, and which can be melted by increasing their temperature so that they can be molded, as is generally defined. For example, it includes polyester elastomers, olefin elastomers, styrene elastomers, and the like. However, it is not elastomers alone that can be used as the material for the sealing member 5. That is, any substance can be used as the material for the sealing member 5, as long as it is elastic and a sealing member formed thereof can satisfactorily seal the optical box. This embodiment uses a thermoplastic elastomer as the sealing member 5. Therefore, the sealing member 5 more easily deforms than the cap 3. The elastic coefficient of the sealing member 5 is larger than the elastic coefficient of the cap 3. The sealing member 5 is provided by an insertion molding, as will be described hereinafter.

Generally speaking, the higher in density is elastomer, the harder it is. Thus, the sealing member 5, which is formed of elastomer, suffers from the following problem. That is, if screws or the like fasteners are used to attach the lid to the optical box, with the presence of the sealing member 5 between the lid and optical box, the sealing member 5 is compressed as the screws or the like are tightened. As the sealing member 5 is compressed, it increases in density, and therefore, it increases in hardness, because it is formed of elastomer. Thus, as the screws or the like are tightened, the sealing member 5 having been increased in hardness by the tightening of the screws or the like causes the optical box and/or its lid to deform. As a result, the optical scanning apparatus 1 changes in the path of the beam of laser light.

Hereafter, therefore, an optical scanning apparatus airtightly sealed with a sealing member capable of keeping the optical box airtightly sealed without causing the optical box of the optical scanning apparatus 1 to deform, will be described.

(Sealing Member)

Figure 3:
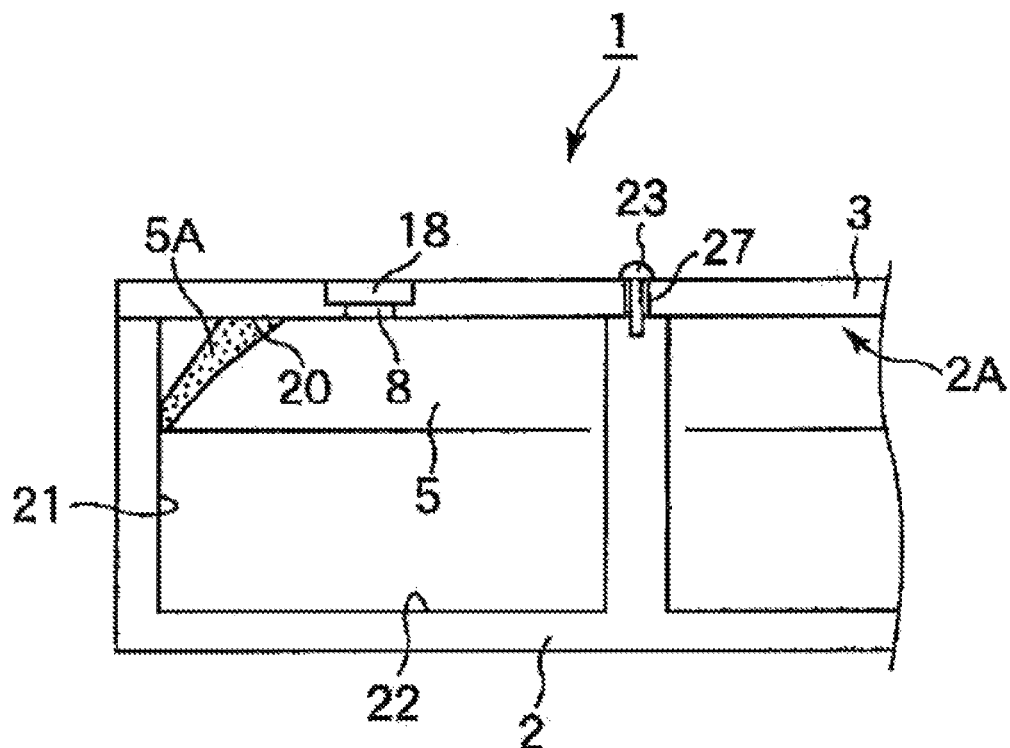
FIG. 3 is a sectional view of one of the end portions of the optical scanning apparatus in the first preferred embodiment of the present invention, and shows the optical box, lid, and sealing member of the apparatus.
Figure 4:
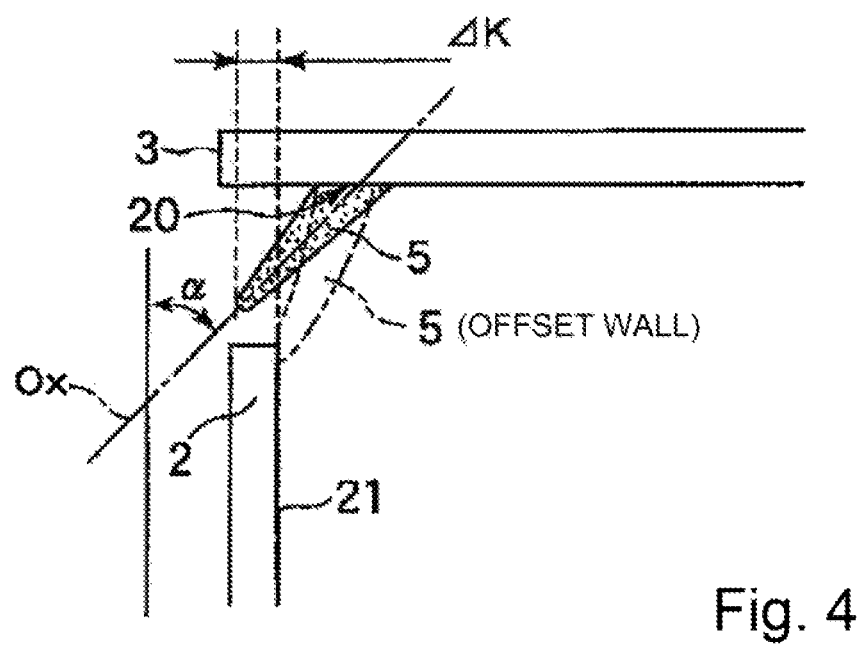
FIG. 4 is a schematic drawing of one of the top corner portions of the optical box, and shows the amount of the sealing member deformation.
Figure 5:
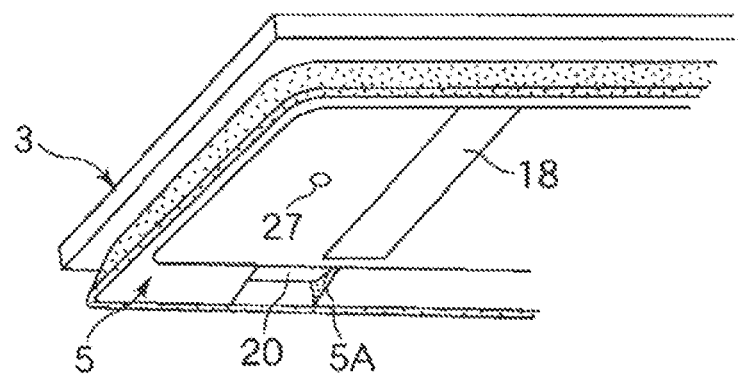
FIG. 5 is a combination of a perspective view of the sealing member, and the lid to which the sealing member has been attached, as seen from below, and a plan view of one of the corner portions of the optical box.
Figure 5:
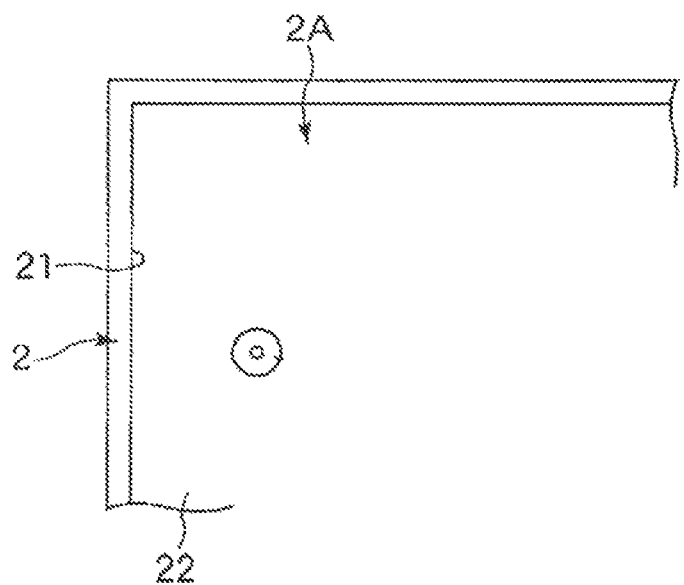
Figure 6:
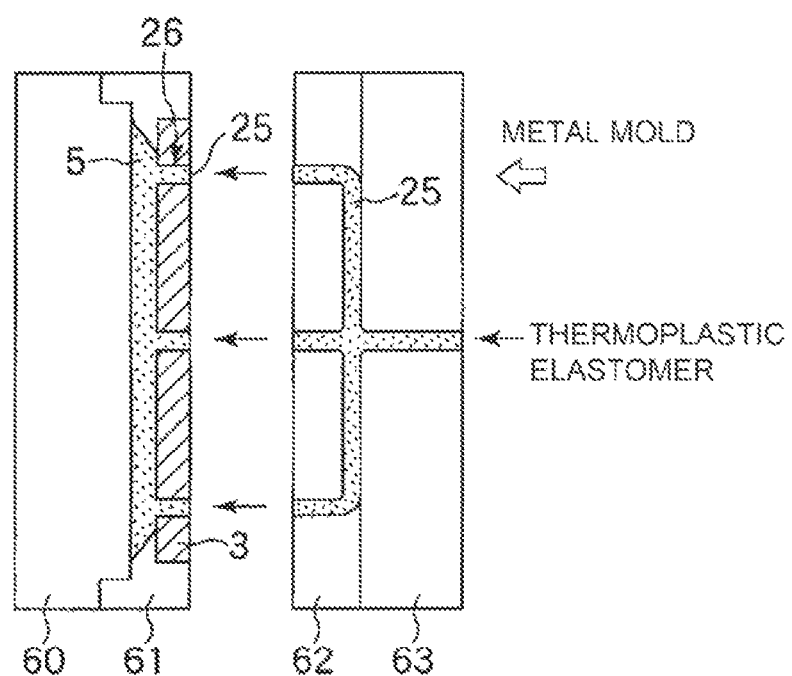
FIG. 6 is a sectional view of the insert molding machine in the first preferred embodiment, and shows the general structure of the machine.
Figure 7:
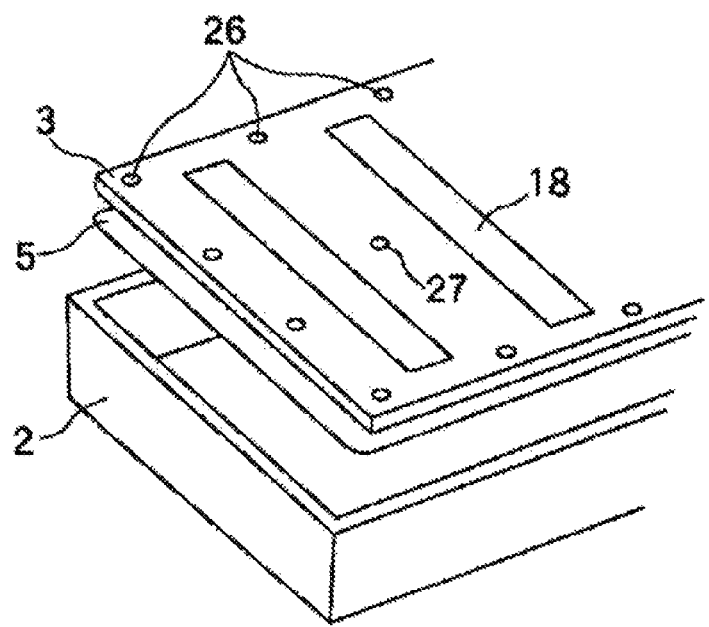
FIG. 7 is a perspective view of the optical box and lid of the optical box, as seen from above.
Figure 8:
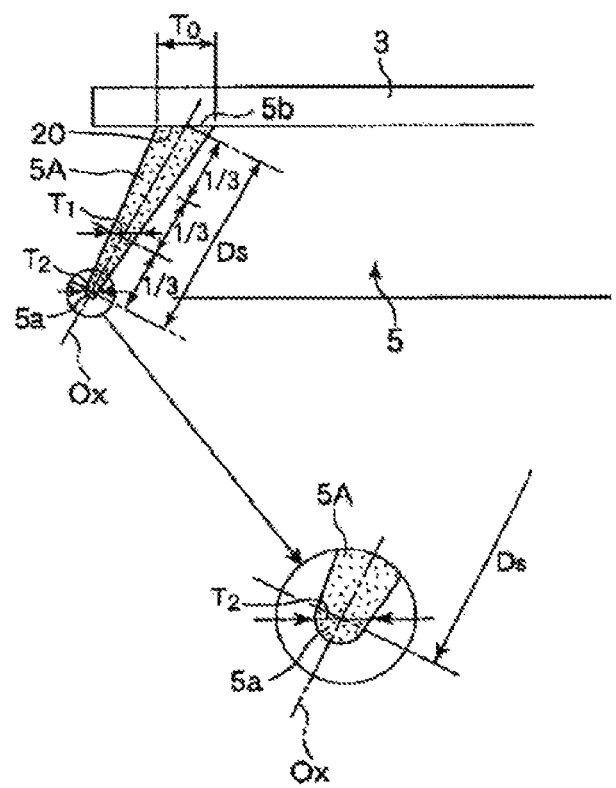
FIG. 8 is a sectional view of the sealing member shaped in such a manner that its cross section is in the form of a thin wedge.
Figure 9:
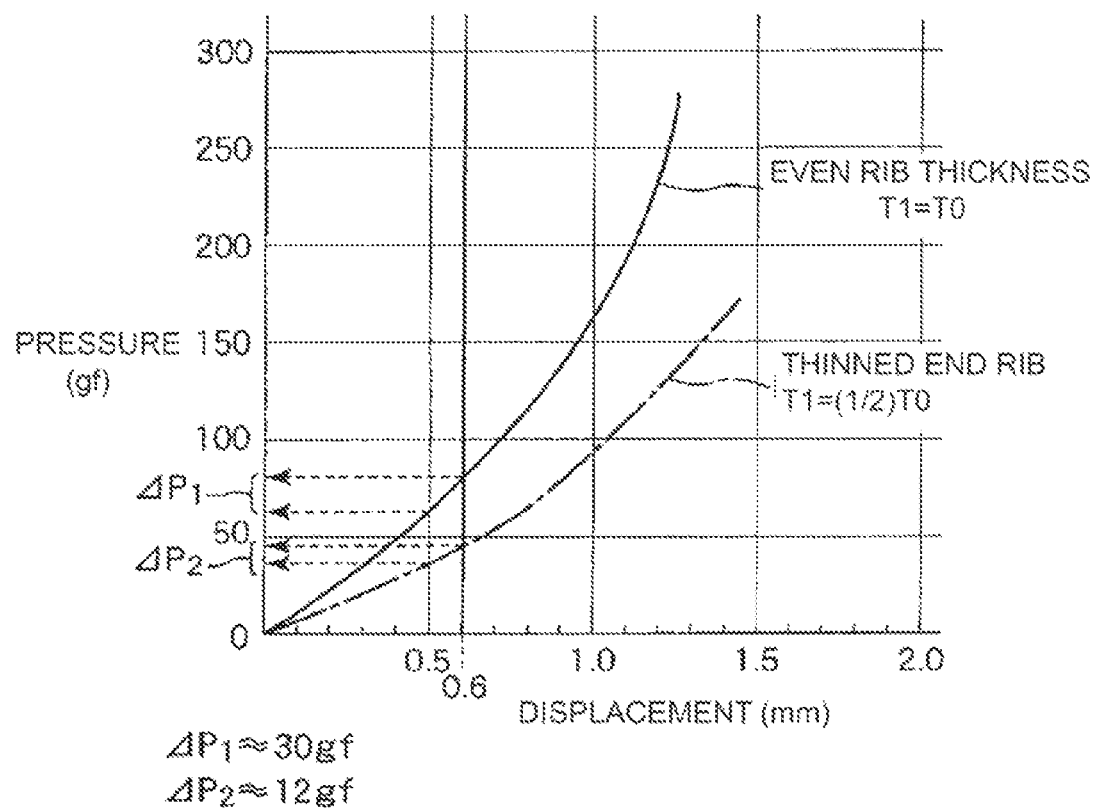
FIG. 9 is a graph which shows the relationship between the amount of displacement of the tip of the sealing member and the amount of pressure applied to the inward surface of the lateral wall of the optical box.
Figure 10:
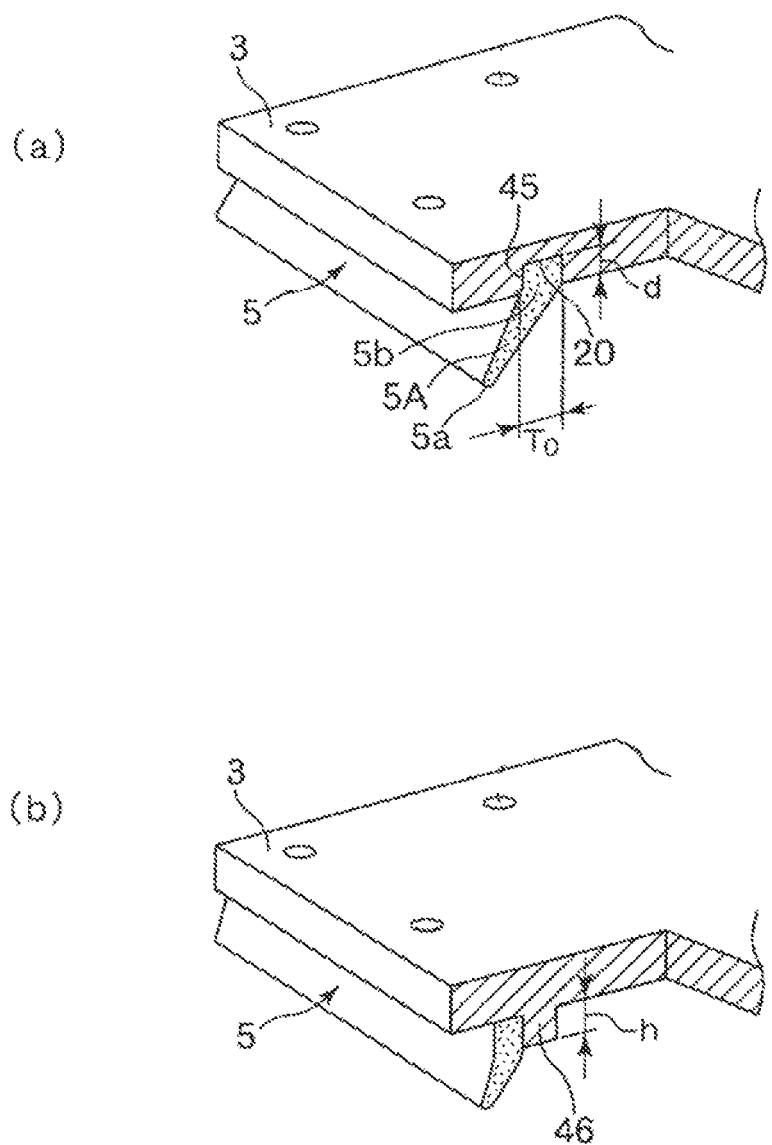
FIG. 10(*a*) is a perspective view of a combination of a modified version of the sealing member in the preferred embodiment and a modified version of the lid in the preferred embodiment, and shows the structures thereof, whereas FIG. 10(*b*) is a perspective view of a combination of another modified version of the sealing member in the preferred embodiment, and another modified version of the lid in the preferred embodiment, and shows the structures thereof.

Next, referring to FIGS. 3-10, the characteristic features of a sealing member in accordance with the present invention will be described using the sealing member 5 in this embodiment. FIG. 3 is a sectional view of one of the corner portions of the optical box 2 of the optical scanning apparatus 1 in this embodiment, and shows the optical box 2, its lid 3 and sealing member 5. FIG. 4 is a schematic drawing of the corner portion of the optical box 2 before the attachment of the lid 3 to the optical box 2, and shows the state of the optical box 2, lid 3, and sealing member 5 before the attachment of the lid 3. FIG. 5 is a combination of a plan view of the optical box, and a perspective view of the lid 2 as seen from below. Further, FIG. 6 is sectional view of an insert molding machine, and shows the general structure of the molding machine. FIG. 7 is a perspective view of the optical box 2 and lid 3 of the optical scanning apparatus 1, as seen from above, before the attachment of the lid 3 to the optical box 2. FIG. 8 is a sectional view of the sealing member shaped so that its cross section looks like that of a thin wedge. FIG. 9 is a graph which shows the relationship between the amount of pressure applied to the sealing member 5 and the amount of the displacement of the tip of the sealing member 5. FIGS. 10(a) and 10(b) are partially perspective and partially cross sectional views of a combination of one of the modified versions of the sealing member 5 and lid 3 in the preferred embodiment, and a combination of another modified versions of the sealing member 5 and lid in the preferred embodiment.

Referring to FIG. 5, the sealing member 5 is attached to the inward surface of the lid 3 of the optical box 2 in such a manner that it extends along the edge of the lid 3. Next, referring to FIG. 3, the sealing member 5 is shaped so that after the attachment of the lid 3 to the optical box 2, it extends to the inward surface 21 of the lateral wall of the optical box 2 from the sealing member attachment portion 20 of the lid 3. That is, the sealing member 5 is structured (shaped) so that in terms of its cross section, the center line Ox of the wedge-like portion 5A of the sealing member 5 (FIGS. 4 and 8) has an angle of a relative to the inward surface 21. More specifically, the sealing member 5 is shaped so that after the attachment of lid 3 to the optical box 2, the angle α between the center Ox and the inward surface 21 of the lateral wall of the optical box 2 is acute. Thus, after the attachment of the lid 3 to the optical box 2, the sealing member 5 remains in contact with the inward surface 21 in such a manner as to continuously presses on the internal surface 21 across the entirety of the horizontal circumference of the optical box 2. Therefore, even if dusts or the like contaminants inwardly passes through the gap(s) between the lid 3 and optical box 2, it is prevented from entering all the way into the main portion of the internal space of the optical box 2.

Normally, the sealing member 5 is shaped so that the angle α is in a range of 10°-60°. If the angle α is no more than 10°, the amount of pressure which the sealing member 5 generates as it presses on the internal surface 21 is insufficient for the sealing member 5 to keep the optical box 2 airtightly sealed. On the other hand, if the angle α is no less than 60°, the amount of pressure which the sealing member 5 generates as it presses on the internal surface 21 is likely to be large enough to cause the optical box 2 to significantly deform. Therefore, it is not desired to shape the sealing member 5 so that its angle α is no less than 60°.

That is, in this embodiment, the sealing member 5 is attached to the lid 3 of the optical box 2 as described above.

Therefore, it does not occur that the sealing member 5 is pinched between the lid 3 and optical box 2. Thus, it does not occur that the sealing member 5 is deformed by being pinched between the lid 3 and optical box 2.

Next, referring to FIGS. 3-5, the gist of the method, in this embodiment, for attaching the lid 3 to the optical box 2 will be described. First, referring to FIG. 4, the lid 3 is to be positioned so that the sealing member 5 comes in contact with the internal surface 21 of the lateral wall of the optical box 2 across the entirety of the horizontal circumference of the optical box. Then, the lid 3 is to be placed in contact with the optical box 2 by being pressed in such a manner that the sealing member 5 is pushed all the way into the optical box 2 while remaining in contact with the internal surface 21. Then, the lid 3 is to be fastened to the optical box 2 by putting the screws 23 (fasteners) through the screw holes 27 and tightening them.

Next, referring to FIG. 4, designated by a referential sign ΔK is the amount of the deformation which occurs to the sealing member 5 when the lid 3 is attached to the optical box 2. In the case of this embodiment, the pressure which the sealing member 5 applies to the inward surface 21 of the lateral wall of the optical box 2 is nothing but the pressure which is generated by the deformation of the sealing member 5 itself. Thus, the amount of the pressure which the sealing member 5 applies to the internal surface 21 is proportional to the amount ΔK of deformation of the sealing member 5 (more specifically, amount of displacement of tip of sealing member 5), being therefore not substantial. In other words, the pressure which keeps the sealing member 5 pressed upon the inward surface 21 comes from the elastic deformation of the sealing member 5.

A conventional optical scanning apparatus structured so that its sealing member formed of elastomer is placed between its optical box and lid thereof suffers from the following problem: As the screws are tightened to keep the optical box airtightly sealed, the sealing member between the optical box 2 and lid 3 is compressed, that is, it is deformed. This deformation of the sealing member 5 causes the optical box 2 and lid 3 to deform.

In comparison, in the case of the above described optical scanning apparatus 1 in this embodiment, its sealing member 5 is not compressed by the optical box 2 and lid 3 even when the screws for attaching the lid 3 to the optical box 2 are tightened. Therefore, unlike the optical box of a conventional optical scanning apparatus, the optical box 2 of the optical scanning apparatus in this embodiment does not suffer from the deformation attributable to the sealing member deformation.

Further, the sealing member 5 in this embodiment remains in contact with the inward wall 21 while remaining deformed by an amount which corresponds to the amount ΔK. Therefore, the sealing member 5 continuously presses on the inward surface 21. Thus, the material for the sealing member 5 is selected from among the elastomers which are low enough in resiliency for the sealing member 5 formed thereof, not to cause the optical box 2 to deform. Further, the optical box 2 designed so that the sealing member 5 is attached to such areas of the lid 3 that do not cause the sealing member 5 to deform the optical box.

Next, referring to FIG. 3, the sealing member 5 is shaped so that it cross section is in the form of a roughly triangular narrow wedge (which hereafter may be referred to as wedge 5A) (FIGS. 3 and 4). Incidentally, the sealing member 5 is shaped so that it is roughly uniform in cross section, being wedge shaped, across the entirety of the horizontal circumference of the lid 3.

As described above, the sealing member 5 of the optical box 2 of the optical scanning apparatus in this embodiment is shaped, and also, is attached to the lid 3, in such a manner that after the attachment of the lid 3 to the optical box 2, the sealing member 5 holds an angle relative to the internal surface 21 of the lateral wall of the optical box 2.

Next, referring to FIGS. 6 and 7, the method for manufacturing the sealing member 5, more specifically, the reliable method for molding a sealing member which is accurate in shape and also, is strong enough to ensure that the optical box 2 remains satisfactorily sealed, will be described.

FIG. 6 is a schematic sectional view of the insert molding machine for manufacturing the sealing member 5 in this embodiment, and shows the structure of the machine. This insert molding machine is provided with: a mold 60 for molding the sealing member 15; a mold 61 for holding the lid 3; a mold 62 having gates through which the molds 60 and 61 are filled with thermoplastic elastomer; and a mold 62 having a gate through which the molds 60 and 61 are filled with the thermoplastic elastomer. As the molds 60, 61, 62 and 63 are put together, the entirety of the gate 25 (elastomer passage), through which the elastomer flows into the combination of the molds 60 and 61, are completed.

Referring to FIG. 6, first, the lid 3 is positioned in the mold 61. Then, the melted elastomer is poured into the combination of the molds 60 and 61. As the melted elastomer is poured, its flows through the holes 26, with which the lid 3 is provided as shown in FIG. 7. Then, the elastomer is cooled. As the elastomer cools, the sealing member 5 is formed on the lid 3 so that it will remain attached to the lid 3 as shown in FIG. 5.

The insert molding machine for forming the sealing member 5 in this embodiment is structured to ensure that after the molds 60, 61, 62 and 63 are put together the thermoplastic elastomer flows through the lid 3, that is, the component to which the resultant sealing member 5 will remain attached, during the processing of molding the sealing member 5. However, when the molds 60, 61, 62, and 63 are separated at the end of the molding process, the elastomer passage 25 is made up of the gates (25), with which the molds 62 and 63 are provided, is broken up at the interface between the lid 3 and mold 62. Therefore, the portions of the sealing member 5, which are in the holes 26 of lid 3, through which the elastomer was poured into the combination of the molds 60 and 61 to form the sealing member 5, are not smooth across their surfaces on the outward side of the lid 3. However, the tip portion (functional portion) of the sealing member, 5 that is, the opposite end of the sealing member 5 from its outward end, are entirely smooth enough to reliably keep the optical box 2 airtightly sealed.

Since the mold for manufacturing the sealing member 5 in this embodiment is structured as described above, the molding pressure can be applied in the direction to ensure that the lid 3 and resultant sealing member 5 remain airtightly in contact with each other, and therefore, the body of elastomer conforms in shape to the molding surface of each mold. Further, the sealing member 5 is molded so that several portions of the sealing member 5 remain in the through holes 26 of the lid 3. That is, the several portions of the sealing member 5, which were molded by the through holes 26 of the lid 3 are integral with the lid 3, improving thereby the sealing member 5 in terms of the airtightness between the lid 3 and sealing member 5. Further, the portions of the sealing member 5, which are in the holes 26 of the lid 3, function like the roots of a plant, ensuring that the sealing member 5 remains stable in shape.

As described above, the sealing member 5 is molded in such a shape that ensures that after the attachment of the lid 3 to the optical box 2, the sealing member 5 extends to the inward surface 21 and remains in contact with the inward surface 21. Next, referring to FIG. 8, this shape (structure) of the sealing member 5 will be described in more detail. One of the characteristics of the sealing member 5 in this embodiment is that it is relatively thin at its tip 5a and thick at its base 5b. The amount of pressure which the sealing member 5 applies to the inward surface 21 is changed by the change in the amount $\Delta K$ by which the tip of the sealing member 5 is displaced. In terms of the amount of the change which is caused, by the displacement of the tip of a sealing member, to the amount of pressure applied to the inward surface of the optical box by the sealing member 5, a sealing member whose tip portion is the same in thickness as its base portion is greater than a sealing member whose tip portion is thinner than its base portion. As long as a sealing member remains in contact with the inward surface of the lateral wall of the optical box, the dusts or the like contaminants can be prevented from entering all the way into the optical scanning apparatus. Therefore, it is not desired to give a sealing member such a shape that causes the sealing member to keep on pressing the inward surface 21 by an unnecessarily large amount of force while it is remaining in contact with the inward surface.

Therefore, the sealing member 5 in this embodiment is shaped so that its base portion 5b is greater in thickness than its tip portion 5a.

FIG. 9 is a graph which shows the effects which the change in the thickness of the sealing member 5 has upon the amount of the pressure applied to the inward surface 21 by the sealing member 5. The horizontal axis of the graph represents the amount $\Delta K$ of the displacement of the tip 5a of the sealing member 5, and the vertical axis represents the amount of pressure which the sealing member 5 applies to the inward surface 21 when the amount of displacement of the tip 5a of the sealing member 5 is $\Delta K$. More specifically, the amount of pressure which the sealing member 5 applies to the inward surface 21 means the amount of pressure which the sealing member 5 applies to the inward surface 21 per centimeter in terms of the circumferential direction of the sealing member 5 after the attachment of the lid 3 of the optical box 2. FIG. 9 shows the results of the actual tests.

In the tests carried out to obtain the data on which FIG. 9 is based, the thickness of the sealing member 5, that is, the dimension of the sealing member 5 in terms of the direction perpendicular to the inward surface 21, that is, the surface on which the sealing member 5 presses, was set as follows. That is, the thickness T0 of the base of the sealing member 5 (portion of sealing member, which is in contact with sealing member attachment portion 20 of lid 3) was 1.6 mm, and the length Ds of the sealing member 5, that is, the distance from the intersection between the center line Ox of the wedge 5A and the sealing member attachment portion 20 to the tip 5a, was 5 mm. Further, the thickness T1, which is the thickness of the portion of the wedge 5A, at the point which is ⅓ of the length Ds from the tip 5a in terms of the lengthwise direction of the wedge 5A, was no more than ½ of the thickness T0 of the base of the sealing member 5 (T1≤(½)0), more specifically, 0.8 mm. Further, the sealing member 5 was shaped so that it gradually reduces in thickness from the portion which is T1 in thickness, toward the tip 5a, in such a manner that the thickness T of the tip 5a becomes roughly 0.5 mm. More specifically, in this embodiment, the tip portion 5a of the sealing member was made semicircular, and 0.5 mm in diameter.

As will be evident from FIG. 9 (graph), when the distance between the tip of the sealing member 5 and the inward surface 21 of the optical box 2 was changed by 0.1 mm (for example, when distance was changed from 0.5 mm to 0.6), the amount $\Delta P2$ of the change which occurred to the amount of pressure applied to the inward surface 21 by the sealing member 5 was roughly 12 gf per centimeter in terms of the direction parallel to the horizontal circumference of the optical box 2.

In comparison, in the case of the sealing member 5 which was uniform in thickness from the base to the tip (if T1=T0), the amount $\Delta P1$ of the change in the amount of pressure applied to the inward surface 21 by the sealing member 5 was roughly 30 gf per centimeter, that is, no less than twice that applied by the sealing member 5 in accordance with the presence invention, under the same conditions.

As will be evident from the results of the above described tests, when the tip portion of the sealing member was displaced, the sealing member which was uniform in thickness of the wedge 5A in terms of the lengthwise direction of the wedge 5A (T1=T0) was excessive in the amount of the change which occurred to the amount of pressure which the sealing member applied to the inward surface 21. In other words, this sealing member was likely to cause the wall of the optical box to deform. Obviously, it is possible to increase the wall of the optical box in thickness. However, the increase in the thickness of the wall of the optical box results in the increase in apparatus size, and therefore, is not desired.

Further, from the standpoint of preventing the wall of the optical box from deforming, it is desired that the pressure which the sealing member 5 applies to the inward surface 21 is as small as possible, as long as the sealing member 5 remains in contact with the inward surface 21. In this embodiment, therefore, the amount $\Delta K$ of the displacement of the tip 5a of the sealing member 5 was set to a value no more than ⅙ of the length Ds of the wedge 5A, in consideration of the shape of the wedge 5A. Further, based on the rigidity of the optical box 2, the criterial value for the amount of pressure applied to the inward surface 21 of the optical box 2 by the sealing member 5, below which the optical box 2 is not deformed by the pressure, was set to be no more than 100 gf per centimeter in terms of the direction parallel to the horizontal circumferential direction of the optical box 2. Further, the sealing member 5 in this embodiment was 61 in the hardness scale defined by "JIS K7215 HDA".

FIGS. 10(a) and 10(b) show the combinations of the modified versions of the sealing member 5 and lid 3 in the preferred embodiment, one for one. As will be evident from FIGS. 10(a) and 10(b), it is desired that the base portion of the sealing member 5 is embedded in the lid 3; the base 5b of the sealing member is inward of the lid 3 relative to the inward surface of the lid 3, more specifically, inward of the sealing member attachment portion 20 of the inward surface of the lid 3. More specifically, the lid 3 in this embodiment is provided with a narrow groove 45, which extends along the entirety of the circumferential edge of the lid 3. From the standpoint of ensuring that the sealing member 5 remains mechanically stable after the attachment of the lid 3 to the optical box 2, it is desired that the lid 3 is designed as will be described next, regarding the groove 45.

The experiments carried out by the inventors of the present invention revealed that it is desired that the depth to which the base portion of the wedge 5A is embedded in the lid 3 is no less than ½ of the thickness T0 of the base of the wedge 5A. The insertion of the base portion of the sealing member 5 into the groove 45 ensures that the sealing member 5 remains satisfactorily attached to the lid 3, because the reactive force to which the sealing member 5 is subjected as it presses on the inward surface 21 is partially borne by the base portion of the sealing member 5, which is in the groove 45. It should be noted here that in a case where the base portion of the sealing member is embedded in the lid 3, T0 is the thickness of the wedge 5A at the inward surface of the lid 3 (FIG. 8).

Next, referring to FIG. 10(b), instead of providing the lid 3 with the groove 45, simply providing the lid 3 with a supporting wall 46 for supporting the sealing member 5 by the base portion of the sealing member 5, can also achieve the same effects as those described above.

As described above, the adoption of the characteristic features of the structure of the sealing member 5 in this embodiment makes it possible to provide a sealing member which is stable in the amount of pressure it applies to the inward surface 21 of the optical box 2.

Further, it is possible to further improve the sealing member 5 in terms of the airtightness between the inward surface 21 and sealing member 5, by modifying the sealing member 5 in each of, or combination of, the thickness and length of its wedge 5A, and its hardness.

As for the amount of the pressure which the sealing member 5 structured as described above applies to the inward surface 21, it was judged proper if it was no more than 100 gf per centimeter, for the following reason.

If the optical box 2 is deformed by the pressure applied to the inward surface 21 by the sealing member 5, the deformation sometimes causes the beam of laser light projected toward the peripheral surface of the photosensitive drums 10, to deviate by several micrometers to several tens of micrometers in terms of the position of the point of the peripheral surface of each of the photosensitive drums 10, onto which the beam of laser light focused. Thus, if the amount of the pressure which the sealing member 5 applied to the inward surface 21 is excessive (which results in deformation of optical box), it is possible that an electrostatic latent image is formed on the wrong portion of the peripheral surface of the photosensitive drums 10.

Further, the amount of the deformation of the optical box 2 was extremely small. Thus, it was virtually impossible to accurately measure the amount of the deformation of the optical box 2. Therefore, in order to determine the acceptable range for the amount of the pressure applied to the inward surface 21 by the sealing member 5, that is, the range in which the positional deviation of the focal point of the beam of laser light, which was caused by the deformation of the optical box 2, is acceptable, experiments were carried out to find out the relationship between the amount of the pressure applied to the inward surface 21 by the sealing member 5 and the positional deviation of the focal point of the beam of laser light on the peripheral surface of the photosensitive drums 10.

The studies made by the inventors of the present invention revealed that in the case of an ordinary optical box 2, no more than 100 gf per centimeter was the range that does not cause the beam of laser light to significantly deviate in position.

Figure 11:
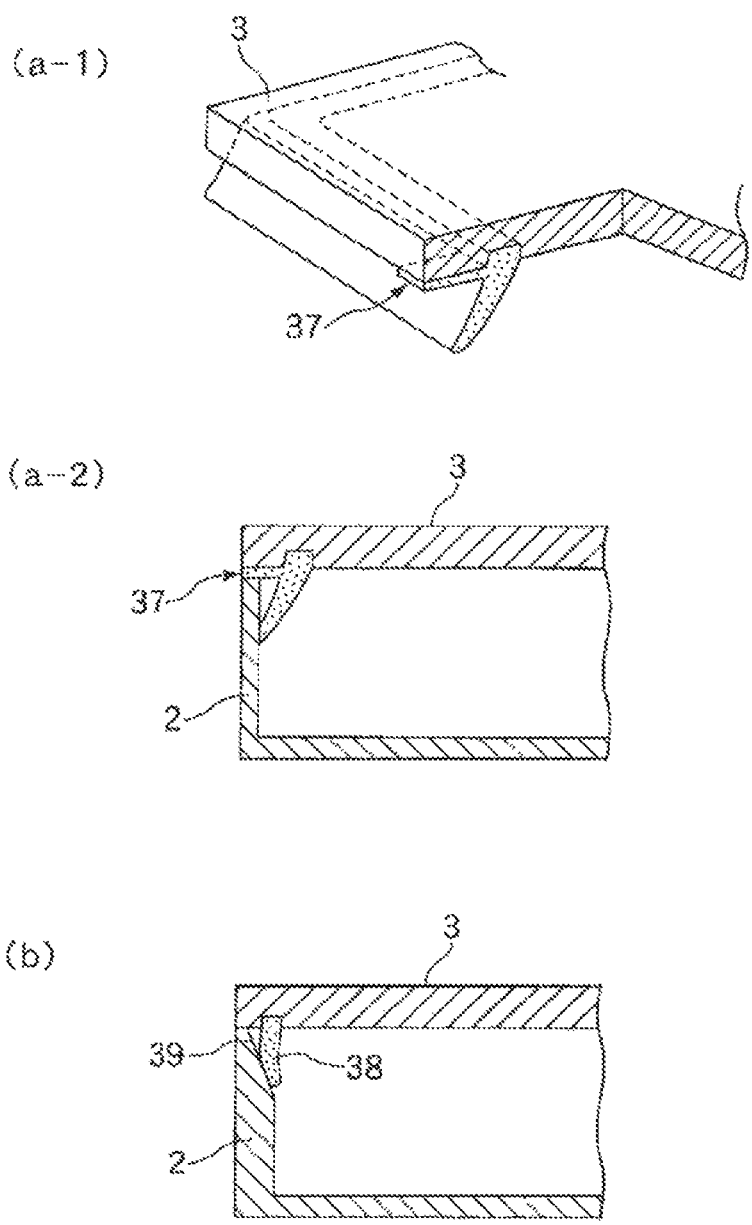
FIGS. 11(*a*-1) and 11(*a*-2) are schematic perspective and sectional drawings, respectively, of another modified version of the sealing member in the preferred embodiment, and another modified version of the lid in the preferred embodiment, and shows the gap filling portion of the sealing member, whereas FIG. 11(*b*) is a schematic drawing of yet another version of the sealing member in the preferred embodiment, another version of the lid in the preferred embodiment, and a modified version of the optical box in the preferred embodiment, and shows the structures thereof.
Figure 12:
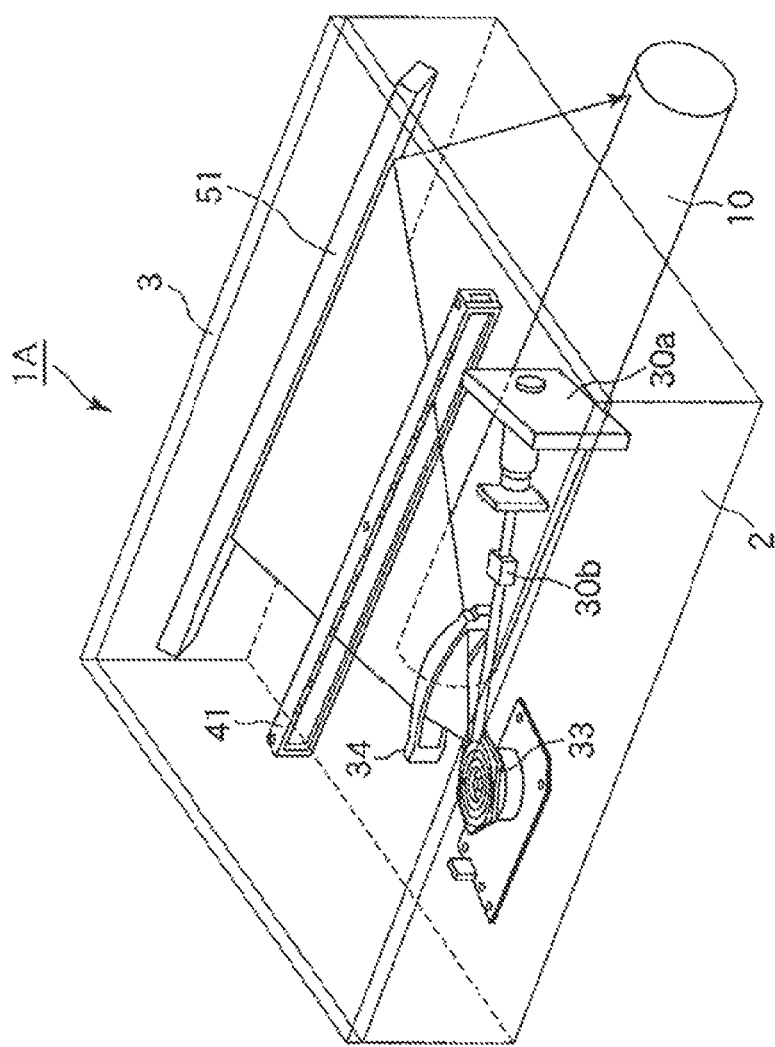
FIG. 12 is a perspective phantom view of an ordinary conventional optical scanning apparatus, and shows the general structure of the apparatus.

Further, referring to FIGS. 11(a-1), 11(a-2), and 11(b), it is possible to modify the above described preferred embodiment in terms of the structure of the sealing member 5 or both the sealing member 5 and optical box 2. The sealing member shown in FIGS. 11(a-1) and 11(a-2) is provided with an additional sealing portion which extends in the outward direction of the optical box from the base portion of the sealing member so that as the lid 3 is attached to the optical box 2, the tip portion of the additional sealing portion is sandwiched between the lid 3 and the optical box 2. Hereafter, the additional sealing portion of this sealing member will be referred to as a gap filling elastic portion 37.

As the lid 3 is attached to the optical box 2, the gap filling elastic portion 37 fills the gap provided between the optical box 2 and the lid 3. However, the amount of the stress generated by the deformation of the gap filling elastic portion 37 can be minimized by shaping the gap filling portion 37 and gap so that their measurements are roughly 1 mm or so, and also, by strictly controlling the sealing member manufacturing process in terms of the measurements of the gap filling portion 37, lid 3 and optical box 2. Thus, the amount of stress attributable to the deformation of the gap filling portion 37 is no more than 10 gf per centimeter in terms of the circumferential direction of the sealing member. In other words, it is smaller by no less than one place than the amount of the pressure applied to the optical box 2 by the sealing member 5. Therefore, the problem that the optical box 2 is deformed by the deformation of the gap filling portion 37 does not occur.

In a case where a part of the inward surface of the lateral wall of the optical box 2 is slanted as shown in FIG. 11(b), which is a sectional view of the optical box in another modification of the preferred embodiment, the sealing member 5, which in this case is an elastic sealing member 38, is attached to the lid 3 in such a manner that after the attachment of the lid 3 to the optical box 2, it remains in contact with the slanted portion 39 of the inward surface of the wall of the optical box 2. This modified version of the preferred embodiment is intended to partially modify the preferred embodiment, from the standpoint of affording more latitude in designing an optical scanning apparatus, in terms of the positioning of its components to be disposed in its optical box. This modified version is also the same as the sealing member having the gap filling elastic portion 35 in that the amount of the pressure applied to the inward surface 21 of the lateral wall of the optical box, and therefore, neither does this cause the optical box to deform.

Described above are only two of the modified versions of the sealing member 5, lid 3, and optical box 2 in the preferred embodiment. It will be evident, however, that any sealing member for sealing the optical box of an optical scanning apparatus, and any structural arrangement for the optical box and lid of an optical scanning apparatus, are to be regarded as the results of the modifications of the preferred embodiment of the present invention, and therefore, are thought to fall within the scope of the present invention.

Described next will be the results of the above mentioned experiments carried out by the inventors of the present invention.

The conditions set up for the experiments are as follows: The length Ds of the wedge 5A was in a range of 3-10 mm, and the shape of the wedge 5A is such that its thickness T1, that is, the thickness at the point which is ⅓ the length of the wedge 5A from the tip of the wedge 5A, was ½ the thickness T0, that is, the thickness of the wedge 5A at its base. Further, the amount ΔK of the displacement of the top 5a of the sealing member 5 was made to be no more than ⅙ the length Ds of the wedge 5A. Further, sealing members which are 25, 40, 61, 75, and 90, respectively, in hardness are evaluated.

As for the criterion for the evaluation, the sealing members 5 which were no more than 100 gf per centimeter were evaluated as the acceptable sealing members.

The relationship between the thickness T0, or the thickness of the wedge 5A at its base, and the hardness of the acceptable (satisfactory) sealing member was as follows:

T0=0.7–1.8 mm . . . sealing members which were 40, 61, 75, or 90 in hardness

T0=1.9–3.0 mm . . . sealing members which were 25, 40, 61, or 75 in hardness

T0=3.1–3.8 mm . . . sealing members which were 25, 40, or 61 in hardness

Regarding the thickness T0 of the base of the wedge 5A of each of the sealing members listed above, it was no more than roughly 3 mm. Thus, in consideration of the generous amount of tolerance in the amount of pressure applied by a sealing member, it may be determined that the sealing members which are no more than 3 mm in the thickness (T0) at the base of their wedges 5A, and are in a hardness range of 40-75 are satisfactory with room to spare. Here, "hardness" means the hardness defined in "JIS K7215 HDA".

Structuring the optical box of the optical scanning apparatus as described above while using thermoplastic elastomer as the material for the sealing member 5 for the optical box makes it possible to provide an optical scanning apparatus which remains satisfactorily sealed from dusts or the like contaminants without suffering from the problem that an optical scanning apparatus is reduced in performance by the deformation of its optical box.

Embodiment 2

This preferred embodiment of the present invention will be described primarily regarding the problem which might occur when assembling the optical scanning apparatus 1, based on the contents of the description of the first preferred embodiment of the present invention given above.

The abovementioned problem that when the lid 3, to which the sealing member 5 formed of thermoplastic elastomer has been attached, is attached to the optical box 2 of the optical scanning apparatus 1, dusts or the like contaminants enter the optical box. Thus, hereafter, the means for preventing the dusts or the like from entering the optical box (optical scanning apparatus) will be described along with this problem.

It is sometimes noticed, during the process of attaching the lid 3 to the optical box 2, that after the formation of the sealing member 5 on the lid 3 in a manner to be integrated with the lid 3, fine dusts have adhered to the integral combination of the sealing member 5 and lid 3.

These dusts are the dusts which were floating in the ambient air. Unless some measures are taken, the dusts having adhered to the sealing member 5 and lid 3 are destined to enter the interior of the optical box, as the lid 3 is attached to the optical box 2. Thus, it is possible that the optical components in the optical box will be soiled by these dusts.

It is generally thought that dusts is more likely to adhere, and remain adhered, to an object holding static electricity than an object holding no static electricity. Thus, it has been known that one of the effective means for preventing the dusts from entering the optical box during the process of assembling an optical scanning apparatus is to reduce, in electrical potential level, the components of the apparatus known to electrostatically attract dusts, with the use of a charge removing apparatus, such as an ionizer, before they are mounted. It is reasonable to think that this means also effective to prevent dusts from adhering to the sealing member 5 and/or removing the dusts from the sealing member 5.

However, these components sometimes increase in charge level even after the removal of the static electricity by a charging removing apparatus. That is, it is possible that the components become charged again with the elapse of time. On the other hand, in a case where the sealing member is rid of static electricity immediately before the process of assembling an optical scanning apparatus, it is impossible to thoroughly remove the dusts having adhered to the sealing member. Therefore, it is desired that an optical scanning apparatus is assembled in an ambience in which the amount by which dusts adheres to its components is as small as possible.

Thus, the inventors of the present invention studied various means for reducing the amount by which dusts adheres to the combination of the sealing member 5 and lid 3 of the optical box, after the molding of the sealing member 5 with the use of the insert molding machine. Further, the following six substances were studied as the material used to form the sealing member 5 by insert molding. These substances are the same as the resinous substance used as the material for the sealing member 5 in the first preferred embodiment, except that they are made different in volume resistivity by dispersing carbon, as electrically conductive substance, in the resinous substance:

A: $5 \times 10^{13} \Omega \times cm$ in volume resistivity R
B: $5 \times 10^{10} \Omega \times cm$ in volume resistivity R
C: $1 \times 10^{10} \Omega \times cm$ in volume resistivity R
D: $5 \times 10^{8} \Omega \times cm$ in volume resistivity R
E: $1 \times 10^{6} \Omega \times cm$ in volume resistivity R
F: $5 \times 10^{5} \Omega \times cm$ in volume resistivity R The measured surface potential levels of these thermoplastic elastomers were as follows: The surface potential levels of substances A and B were in a range of roughly 100-1K, and were unstable. The surface potential levels of the substances C-F were in a range of roughly 50-100 V. These figures were obtained by measuring the surface potential levels of the sealing members formed of these substances, after the sealing members molded by insert molding were left as it was, following the molding of the sealing members.

It is reasonable to think, based on these results, that it is unlikely for dusts to electrostatically adhere to the sealing members formed of the materials C-F. However, the materials F was substantial in the amount of carbon content, and therefore, the sealing members formed of the material F were inferior in elasticity, being unable to satisfactorily seal the optical box.

Thus, the proper range for the volume resistivity of the material for the sealing member 5, that is, the range in which the sealing member formed of any of these materials can satisfactorily seal the optical box while remaining low in potential level, is $$1 \times 10^6 \, \Omega cm \leq R \leq 1 \times 10^{10} \, \Omega cm.$$

Further, there were thermoplastic elastomers which were lower in volume resistivity than those listed above. However, an optical scanning apparatus is an electric device which internally holds a motor, a semiconductor laser, and groups of electric circuit. Therefore, the thermoplastic elastomers which were lower in volumetric resistivity than those listed above were not taken into consideration as the material for the sealing member, in fear of short circuit.

Further, the substances listed above were easily obtainable, and were relatively stable in volume resistivity. These materials have been disclosed in Japanese Laid-open Patent Applications 2003-20411 (title of invention: thermoplastic resinous compounds) and 2003-277622 (title of invention: compound for charge control, and method for manufacturing compound).

It is evident from the detailed description of the preferred embodiment of the present invention that as long as the volume resistivity of a material for a sealing member is within the range of $$1 \times 10^6 \, \Omega cm \leq R \leq 1 \times 10^{10} \, \Omega cm,$$

the potential level to which the material will be charged is no more than the criterial value of 100 V. Therefore, it is reasonable to think that a sealing member formed of this material is relatively small in the amount of dusts adhesion.

Thus, it is desired that an elastomer with the above described characteristics is used as the material for the sealing member for an optical scanning apparatus.

With the use of a lid provided with a sealing member, such as those described above, as the lid 3 for the optical box of an optical scanning apparatus, it is possible to reduce the amount by which dusts enter the optical scanning apparatus 1 when the optical scanning apparatus 1 is assembled. That is, the use contributes to the manufacturing of an optical scanning apparatus (1) which is superior and stable in writing performance.

Embodiment 3

Referring to FIGS. 13A, 13B and 13C, a further embodiment of the present invention will be described. FIG. 13A is a sectional view of a part of a cap 3 and a different bent type sealing member 131. FIG. 13B is a partial perspective view of the bent type sealing member 131. FIG. 13C is a partially sectional view illustrating a state in which the bent type sealing member 131 is in contact with the inner wall 21 (side wall 21) of the optical box. The broken line 21a shows a surface of the wall when the inner wall 21 is offset inwardly.

The bent type sealing member 131 of this embodiment is produced, similarly to the first embodiment, by the insertion molding with a thermoplastic elastomer, wherein the sealing member 131 has a material and rigidity which are different from those of the cap 3, similarly. The bent type sealing member 131 of this embodiment is different from the first embodiment in the sealing material and the cross-sectional configuration. As shown in FIG. 13A, the bent type sealing member 131 includes a base portion 132 extending from the cap 3, and a contact portion 133 extending and bending from the base portion 132 toward the inner wall 21 of the optical box. In other words, the bent type sealing member 131 is constituted by the base portion 132 and the contact portion 133. As shown in FIG. 13C, the contact portion 133 is contacted to the inner wall 21 when it caps the optical box 2.

The contact portion 133 is thinner and longer than in the first embodiment, and therefore, it is more flexible. With the higher flexibility of the contact portion 133, the force required to bend is more even despite the position where it is bent varies slightly. In other words, the force pressing against the wall is small, and therefore, the deformation of the inner wall 21 is small.

On the other hand, the base portion 132 is relatively thick as compared with the contact portion 133 to be more difficult to flex. Because of the larger thickness, in the section, of base portion 132, when the cap 3 is set to the optical box 2, the contact portion 133 flexes such that leading side of the contact portion 133 bends toward the cap 3. By doing so, the dust free property of the optical box is assured by the bent type sealing member 131.

Furthermore, the bent type sealing member 133 provides the following advantages. The optical box 2 is a mold product, and therefore, it is influenced by the manufacturing variation of the metal. That is, as shown in FIG. 13C, the position of the inner surface of the wall 21 may be offset as indicated by the phantom line 21a due to the variation in the manufacturing accuracy. Even in such a case, the leading side of the bent type sealing member 131 compensate for such a variation in a wide range by the bending as indicated by broken lines. More particularly, the flexibility is enough to accommodate approx. ±0.7 mm deviation of the inner surface of the inner wall 21 and accommodate ±1.5 mm in total including the manufacturing variation of the cap, so that bent type sealing member 131 is assuredly contacted to the surface of the inner wall 21.

It is desirable that thin long portion in the free end side of the sealing member has a length of approx. 2-10 mm and a thickness of approx. 0.2-0.8 mm.

The thickness of the contact portion 133 may be partly changed to limit the position of bending when the contact portion 133 contacts the inner wall 21.

According to this embodiment, even when the position of the sealing member 131 relative to the inner wall 21 varies, the urging pressure can be significantly uniform. In addition, it can be closely contacted to the inner wall 21 assuredly, and therefore, the dust preventing sealing effect can be assured even under the influence of manufacturing tolerance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 057079/2008 filed Mar. 6, 2008 which is hereby incorporated by reference.

What is claimed is:

1. An optical scanning apparatus comprising:
    an optical box for accommodating a deflecting device for deflecting a laser beam emergent from a light source, and for accommodating an optical portion member for directing the laser beam to photosensitive member;
    a cap mounted to a top surface of a side wall of the optical box; and
    a sealing member molded on the cap, the sealing member being made of a material which is different from that of the cap and which is more easily deformed than the cap;
    wherein in a state that the cap is fixed to the top surface of the side wall of the optical box, the sealing member extends between an inside surface of the side wall of the optical box and a central portion of the cap, at positions spaced apart from a contact portion at which the cap contacts the top surface of the side wall of the optical box, and
    wherein the sealing member flexes, when the cap is mounted to the top surface of the side wall of the optical box, between a free end portion and a base portion at which the sealing member flexes so that the free end portion faces toward the cap, and wherein in a state that cap is fixed to the top surface of the side wall of the optical box, the sealing member contacts the inside surface of the side wall which does not face the cap in a state that sealing member flexes with the free end portion facing toward the cap.

2. The optical scanning apparatus according to claim 1, wherein the sealing member prevents dust passed through the contact portion from entering a space in which the deflecting device and the optical portion member are provided, by contacting the inside surface of the side wall in the state that sealing member flexes with the free end portion facing toward the cap.

3. The optical scanning apparatus according to claim 1, wherein the sealing member is formed on the cap by insertion molding.

4. The optical scanning apparatus according to claim 3, wherein the sealing member is a thermoplastic elastic member, and wherein the cap includes an inlet port for supplying, in the insertion molding, a molten thermoplastic elastic member, and a flow path for guiding the thermoplastic elastic member supplied to the inlet port so that the sealing member is formed at a position contacting the side wall of the optical box in the state that the cap is mounted to the optical box.

5. The optical system according to claim 1, wherein the free end portion has a thickness smaller than that at the base portion.

6. The optical scanning apparatus according to claim 1, wherein the sealing member has a volume resistivity R wherein $$1\times10^6 \, \Omega\text{cm} \leq R \leq 1\times10^{10} \, \Omega\text{cm}.$$

7. The optical scanning apparatus according to claim 1, wherein the sealing member has a bent portion between the free end portion and the base portion, and the free end portion of the sealing member faces toward the cap by the sealing member flexing between the free end portion and the bent portion.

8. The optical scanning apparatus according to claim 1, wherein the sealing member stands from the central portion of the cap in its spaced apart position from the contact portion.

* * * * *